US009452680B2

(12) United States Patent
Uchida

(10) Patent No.: US 9,452,680 B2
(45) Date of Patent: Sep. 27, 2016

(54) VEHICLE CONTROL DEVICE

(71) Applicant: JTEKT CORPORATION, Osaka-shi (JP)

(72) Inventor: Nobuhiro Uchida, Yamatotakada (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/580,457

(22) Filed: Dec. 23, 2014

(65) Prior Publication Data

US 2015/0191087 A1    Jul. 9, 2015

(30) Foreign Application Priority Data

Jan. 7, 2014  (JP) .................. 2014-000927

(51) Int. Cl.
*B60L 3/04* (2006.01)
*B60L 3/00* (2006.01)
(Continued)

(52) U.S. Cl.
CPC ............. *B60L 3/04* (2013.01); *B60L 3/0007* (2013.01); *B60L 3/0046* (2013.01); *B60L 3/0069* (2013.01); *B60L 7/18* (2013.01); *B60L 11/005* (2013.01); *B60L 11/14* (2013.01); *B60L 11/1877* (2013.01); *B60L 15/007* (2013.01); *B60L 15/2009* (2013.01); *B60W 10/02* (2013.01); *B60W 20/50* (2013.01); *B60L 2220/52* (2013.01); *B60L 2240/12* (2013.01); *B60L 2240/14* (2013.01); *B60L 2240/547* (2013.01); *B60L 2250/26* (2013.01); *B60L 2250/28* (2013.01); *B60L 2260/28* (2013.01); *H02M 2001/322* (2013.01); *Y02T 10/641* (2013.01); *Y02T 10/645* (2013.01); *Y02T 10/70* (2013.01); *Y02T 10/7005* (2013.01); *Y02T 10/705* (2013.01); *Y02T 10/7022* (2013.01); *Y02T 10/7077* (2013.01); *Y02T 10/72* (2013.01); *Y02T 10/7275* (2013.01); *Y10S 903/946* (2013.01)

(58) Field of Classification Search
CPC ........................................ B60L 3/04
See application file for complete search history.

(56) References Cited

U.S. PATENT DOCUMENTS

2010/0235029 A1*  9/2010  Becker .............. B60K 6/365 701/22
2012/0309588 A1  12/2012  Ashida et al.
2014/0309827 A1  10/2014  Kanzaki et al.

FOREIGN PATENT DOCUMENTS

JP   2006-141158 A   6/2006
JP   2010-178595 A   8/2010
(Continued)

OTHER PUBLICATIONS

Extended European Search Report issued Oct. 20, 2015 in Patent Application No. 15150070.9.

*Primary Examiner* — Mussa A Shaawat
*Assistant Examiner* — Kelly D Williams
(74) *Attorney, Agent, or Firm* — Oblon, McClelland, Maier & Neustadt, L.L.P.

(57) ABSTRACT

A vehicle control device includes a drive motor and an engaging/disengaging mechanism having a function to permit and cut off torque transmission between the drive motor and wheels. The vehicle control device further includes a smoothing capacitor that smoothes electric power applied from a secondary battery, a drive circuit for the drive motor, a drive circuit for the engaging/disengaging mechanism, and a microprocessor for controlling each drive circuit. If it is determined that a collision of a vehicle has occurred, the microprocessor disconnects each drive circuit from the secondary battery, and outputs a command to disengage the engaging/disengaging mechanism.

5 Claims, 6 Drawing Sheets

(51) Int. Cl.
  *B60L 11/00*    (2006.01)
  *B60L 11/14*    (2006.01)
  *B60L 11/18*    (2006.01)
  *B60L 15/00*    (2006.01)
  *B60W 10/02*    (2006.01)
  *B60W 20/00*    (2016.01)
  *B60L 7/18*     (2006.01)
  *B60L 15/20*    (2006.01)
  *H02M 1/32*     (2007.01)

(56) References Cited

FOREIGN PATENT DOCUMENTS

| JP | 2010178595 A | * | 8/2010 | |
| JP | 2013-90424 | | 5/2013 | |
| JP | 2013-217386 A | | 10/2013 | |
| JP | 2013217386 A | * | 10/2013 | |
| JP | WO 2014076563 A1 | * | 5/2014 | ............... B60K 6/24 |

\* cited by examiner

F I G . 5A
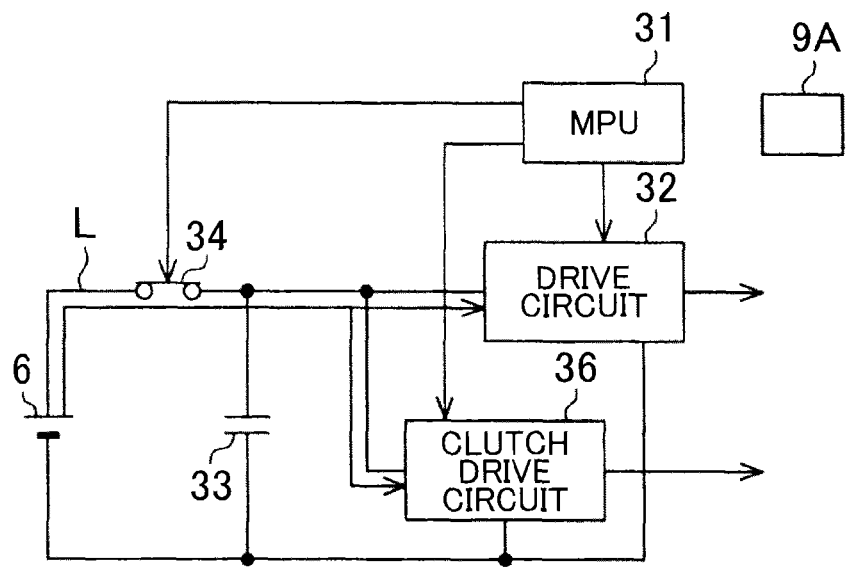
F I G . 5B
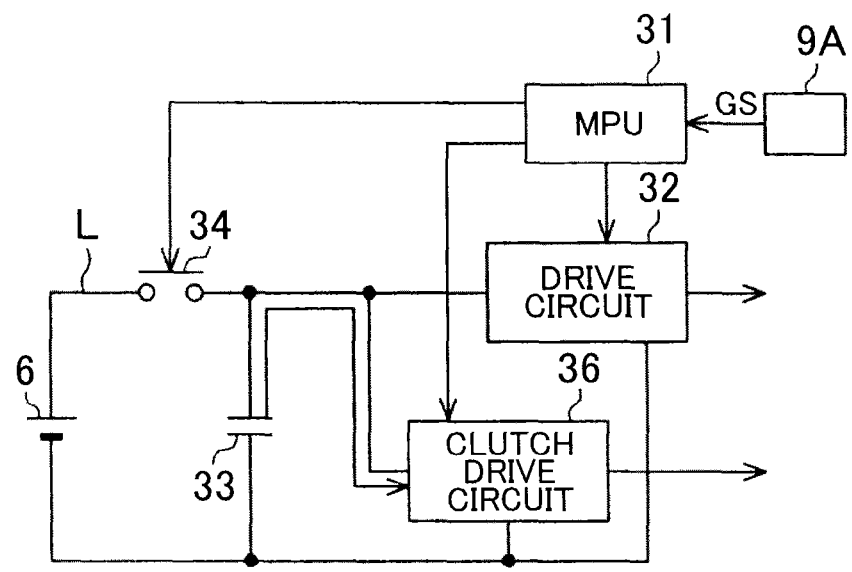

VEHICLE CONTROL DEVICE

INCORPORATION BY REFERENCE

The disclosure of Japanese Patent Application No. 2014-000927 filed on Jan. 7, 2014 including the specification, drawings and abstract, is incorporated herein by reference in its entirety.

BACKGROUND OF THE INVENTION

1. Field of the Invention

The invention relates to vehicle control devices.

2. Description of the Related Art

Conventionally, a vehicle control device described in Japanese Patent Application Publication No. 2013-90424 (JP 2013-90424 A) is known as an example of vehicle drive devices that are mounted on vehicles and convert direct current (DC) power supplied from a secondary battery to alternating current (AC) power to control a rotation operation of a rotating electrical machine such as a motor. This vehicle control device includes smoothing capacitors for smoothing electric power in order to stably output AC power.

In such a vehicle control device, the smoothing capacitors need be quickly discharged if an abnormality occurs, safety such as to protect an occupant from electric shock if an abnormality occurs such as a case of a collision accident of the vehicle.

In the vehicle control device described in JP 2013-90424 A, a discharging module having a discharging resistor connected thereto is separately provided, so that the smoothing capacitor can be discharged by connecting the smoothing capacitors to the discharging module in a collision accident etc. of the vehicle. In this vehicle control device, however, the discharging module is separately provided in addition to the existing vehicle control device. Accordingly, an increase in size of the vehicle control device is unavoidable.

SUMMARY OF THE INVENTION

It is one object of the invention to provide a vehicle control device capable of suppressing an increase in size of the device.

A vehicle control device according to one aspect of the invention includes: a smoothing capacitor; a first drive circuit; a second drive circuit; a control circuit; and a switch. The vehicle control device controls an on-board device mounted a vehicle. The on-board device includes a rotating electrical machine, and an engaging/disengaging mechanism having a function to permit and cut off torque transmission between a driven body that is rotationally driven by the rotating electrical machine and the rotating electrical machine. The smoothing capacitor smoothes electric power that is applied from a power supply mounted on the vehicle. The first drive circuit drives the rotating electrical machine with the electric power smoothed by the smoothing capacitor. The second drive circuit drives the engaging/disengaging mechanism with the electric power smoothed by the smoothing capacitor. The control circuit controls the first drive circuit and the second drive circuit. The switch has a function to connect and disconnect the first drive circuit and the second drive circuit to and from the power supply, and is provided closer to the power supply such that the smoothing capacitor is interposed between the switch and the first and second drive circuits. If an abnormal condition of the vehicle having the on-board device mounted thereon is detected in a state where the drive circuits are connected to the power supply, the control circuit switches the switch to disconnect the drive circuits from the power supply and supplies electric power generated by charge stored in the smoothing capacitor to the engaging/disengaging mechanism via the second drive circuit.

According to this configuration, if an abnormal condition of the vehicle having the on-board device mounted thereon is detected with the power supply being connected to the drive circuits, the drive circuits are disconnected from the power supply, and the electric power generated by the charge stored in the smoothing capacitor is temporarily supplied to the engaging/disengaging mechanism, so that the smoothing capacitor is discharged. This eliminates the need for a dedicated device etc. to discharge the smoothing capacitor, and can suppress an increase in size of the vehicle control device.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 5A is a diagram schematically showing how electric power is supplied to drive circuits;

FIG. 5B is a diagram schematically showing how electric power is supplied to the drive circuits.

DETAILED DESCRIPTION OF EMBODIMENTS

A first embodiment of a vehicle control device will be described below with reference to the accompanying drawings.

Figure 1:
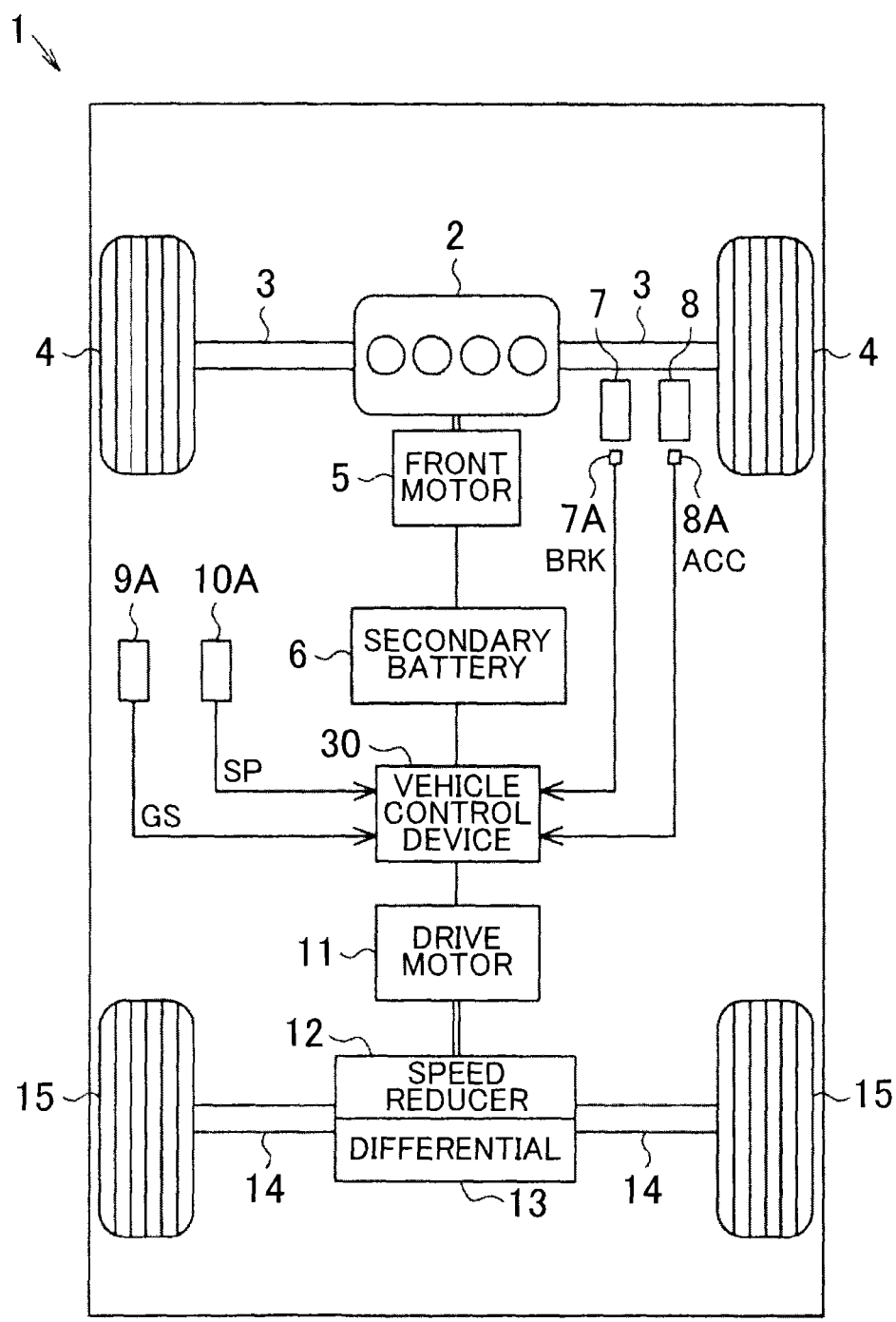
FIG. 1 is a diagram schematically showing a vehicle.

As shown in FIG. 1, a vehicle 1 includes an internal combustion engine 2 as a driving source of the vehicle 1. A drive shaft 3 is coupled to the internal combustion engine 2 so that power of the internal combustion engine 2 can be transmitted to the drive shaft 3. A pair of right and left front wheels 4 located on the front side of the vehicle 1 is coupled to the internal combustion engine 2 via the drive shaft 3.

A front motor (in the present embodiment, a three-phase brushless motor) 5 is mechanically coupled to the internal combustion engine 2. The front motor 5 functions as a generator that rotates in response to rotation output of the internal combustion engine 2 to generate electric power. For example, a secondary battery 6 such as a lithium ion battery is electrically connected to the front motor 5, as a power supply that is charged by the electric power generated by the front motor 5. A vehicle control device 30 is electrically connected to the secondary battery 6, and a drive motor (in the present embodiment, a three-phase brushless motor) 11 is electrically connected to the secondary battery 6 via the vehicle control device 30. The vehicle control device 30 operates with electric power of the secondary battery 6, and the drive motor 11 is a rotating electrical machine serving as a driving source for the vehicle 1.

Various sensors that detect a traveling state etc. of the vehicle 1, such as a brake sensor 7A, an accelerator sensor 8A, an acceleration sensor 9A, and a vehicle speed sensor 10A, are electrically connected to the vehicle control device 30. The brake sensor 7A is a sensor that detects a brake operation amount BRK of a brake pedal 7, and the accelerator sensor 8A is a sensor that detects an accelerator operation amount ACC of an accelerator pedal 8. The acceleration sensor 9A is a sensor that detects a variation GS in impact on the vehicle 1, and detects a collision of the vehicle 1, namely an abnormal condition of the vehicle 1. A pressure sensor may be used instead of the acceleration sensor in order to detect a collision of the vehicle 1. The vehicle speed sensor 10A is a sensor that detects a vehicle speed SP of the vehicle 1.

The vehicle control device 30 grasps a traveling state of the vehicle 1 based on detection signals from these sensors, and controls an on-board device according to the traveling state. The on-board device shown in the present embodiment is formed by the drive motor 11 (a device that generates a driving force for the vehicle 1) and a clutch motor 29 (an engaging/disengaging mechanism 40 that permits and cuts off transmission of torque).

A speed reducer 12 and a differential gear (hereinafter referred to as the "differential") 13, which adjust power of the drive motor 11 to transmit the adjusted power to drive shafts 14, are coupled to the drive motor 11. A pair of right and left rear wheels 15 located on the rear side of the vehicle 1 is coupled to the drive motor 11 via the speed reducer 12, the differential 13, and the drive shafts 14.

The vehicle 1 is a so-called hybrid vehicle in which the front motor 5 generates electric power with the power of the internal combustion engine 2 to charge the secondary battery 6, and the electric power is supplied from the secondary battery 6 to the drive motor 11 to cause the drive motor 11 to generate a driving force that propels the vehicle 1.

The driving force for the vehicle 1 is generated as the power of the drive motor 11 is transmitted to each rear wheel 15 (driven body) as a torque force that rotates each drive shaft 14. A clutch CL has a function to permit and cut off transmission of torque from the drive motor 11 to each rear wheel 15.

The configuration of the drive motor 11, the speed reducer 12, the differential 13, and the drive shafts 14 will be described.

Figure 2:
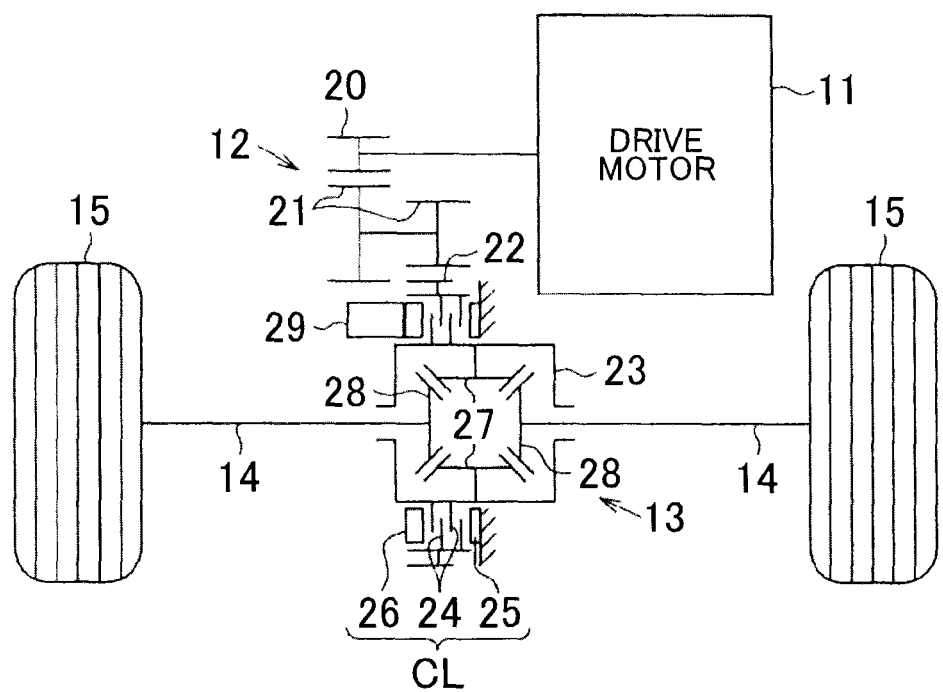
FIG. 2 is a diagram schematically showing a differential gear.

As shown in FIG. 2, an output gear 20 that transmits the power of the drive motor 11 to the speed reducer 12 is mechanically coupled to the drive motor 11. The speed reducer 12 includes a plurality of reduction gears 21 having different numbers of teeth. The reduction gears 21 mesh with the output gear 20 and are mechanically coupled to the output gear 20. The reduction gears 21 thus transmit rotation of the output gear 20 to the differential 13.

The differential 13 includes a ring gear 22 that meshes with the reduction gears 21 and is mechanically coupled to the reduction gears 21, and a differential case 23 that rotates together with the ring gear 22. The clutch CL is interposed between the ring gear 22 and the differential case 23. The clutch CL mechanically couples or decouples (engages or disengages) the ring gear 22 and the differential case 23. The clutch CL includes a plurality of clutch plates 24 that are fixed to either the ring gear 22 or the differential case 23. The clutch CL is provided with a clutch receiving portion 25 and a clutch pressing portion 26 such that the clutch plates 24 are sandwiched therebetween. The clutch receiving portion 25 is fixed to the differential case 23, and the clutch pressing portion 26 can move toward and away from the clutch receiving portion 25. The clutch motor (in the present embodiment, a DC motor with a brush) 29 as a driving source for the clutch pressing portion 26 is mechanically coupled to the clutch pressing portion 26. An engaging/disengaging mechanism 40 is formed by the clutch CL (the clutch plates 24, the clutch receiving portion 25, and the clutch pressing portion 26) and the clutch motor 29.

A pair of differential pinion gears 27 and a pair of differential side gears 28 are attached to the differential case 23. The pair of differential side gears 28 mesh with the differential pinion gears 27 and are mechanically coupled to the differential pinion gears 27. The drive shafts 14 are mechanically coupled to the respective differential side gears 28.

The clutch motor 29 is electrically connected to the vehicle control device 30 so as to operate with the electric power of the secondary battery 6. This clutch motor 29 has, e.g., a ball screw structure that converts rotation of the clutch motor 29 to linear motion for the clutch pressing portion 26 to move toward and away from the clutch receiving portion 25.

When rotating in a forward direction, the clutch motor 29 causes the clutch pressing portion 26 to move toward the clutch receiving portion 25 to engage the clutch CL, thereby mechanically coupling the ring gear 22 to the differential case 23. The magnitude of the power of the drive motor 11 is thus adjusted by the speed reducer 12 and the differential 13, and the adjusted power is transmitted as torque to each rear wheel 15.

When rotating in a reverse direction, the clutch motor 29 causes the clutch pressing portion 26 to move away from the clutch receiving portion 25 to disengage the clutch CL, thereby mechanically decoupling the ring gear 22 from the differential case 23. This cuts off torque transmission from the drive motor 11 to each rear wheel 15.

The electrical configuration of the vehicle 1 will be described mainly with respect to the vehicle control device 30.

Figure 3:
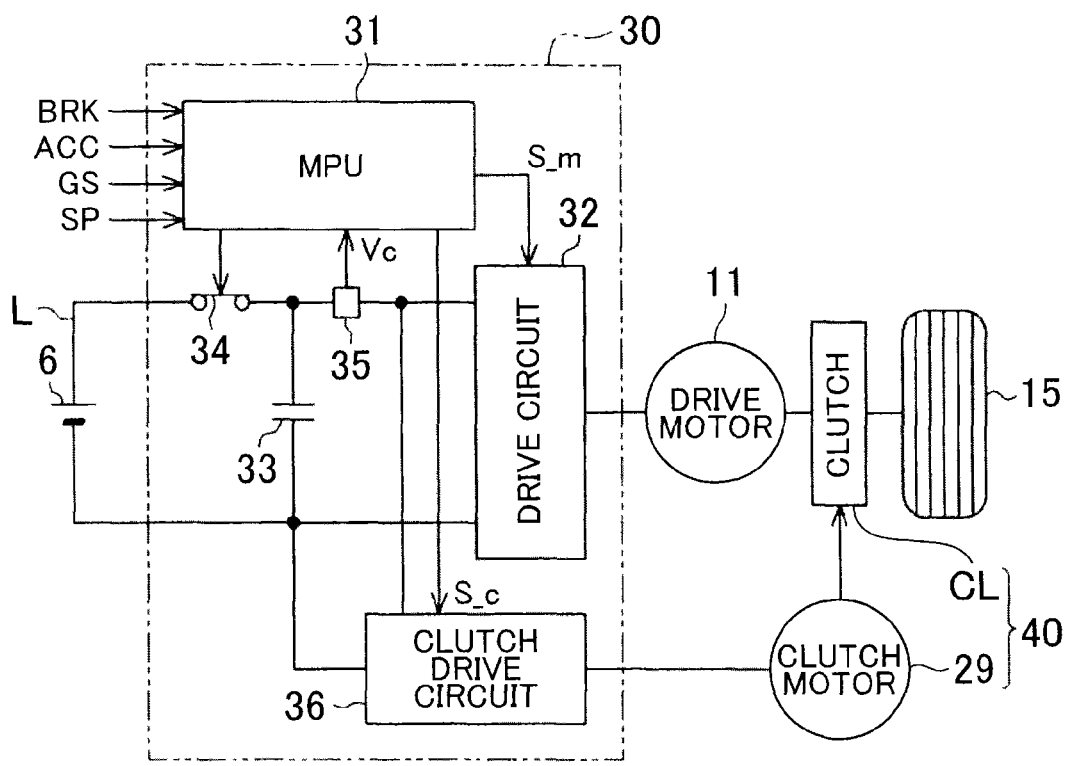
FIG. 3 is a block diagram schematically showing a vehicle control device.

As shown in FIG. 3, the vehicle control device 30 includes a microprocessor (hereinafter referred to as the "MPU") 31 as a control circuit that outputs a drive motor control signal S_m. The vehicle control device 30 further includes a drive circuit 32 as a first drive circuit that drives the drive motor 11 by supplying driving electric power to the drive motor 11 based on the drive motor control signal S_m output from the MPU 31.

The drive circuit 32 is a well-known PWM inverter control circuit using a pair of series-connected switching elements (e.g., FETs) as a base unit and having pairs of series-connected switching elements connected in parallel so as to correspond to motor coils of the respective phases. The drive motor control signal S_m that is output from the MPU 31 specifies the on/off state of each switching element. Each switching element is turned on or off in response to the drive motor control signal S_m, whereby driving electric power is output to the drive motor 11.

The drive circuit 32 is connected to the secondary battery 6 as a main power supply via a power supply line L. The drive circuit 32 turns on or off each switching element to convert DC power of the secondary battery 6 as a DC power supply to AC power, thereby supplying three-phase driving electric power to the drive motor 11.

A smoothing capacitor 33 that smoothes a current flowing in the power supply line L is connected at an intermediate position on the power supply line L, namely between the drive circuit 32 and the secondary battery 6. A switch 34 formed by a mechanical relay is provided between the smoothing capacitor 33 and the secondary battery 6. When the switch 34 is turned on, the power supply line L is electrically connected, and electric power is supplied from the secondary battery 6. When the switch 34 is turned off, the power supply line L is electrically disconnected, and power supply from the secondary battery 6 is cut off.

A voltage sensor 35 that detects an output voltage Vc of the smoothing capacitor 33 is provided on the power supply line L. The voltage sensor 35 is connected to the MPU 31, and outputs a signal representing an output voltage Vc to the MPU 31.

The various sensors that detect the traveling state etc. of the vehicle 1 are connected to the MPU 31, and various detection results such as the brake operation amount BRK, the accelerator operation amount ACC, the variation GS in impact, and the vehicle speed SP are input from these sensors to the MPU 31. The MPU 31 controls operation of the drive motor 11 and the switch 34 based on the received detection results.

The MPU 31 outputs a clutch motor control signal S_c when conditions that the state of the clutch CL should be switched are satisfied such as when an ignition switch is turned on or off. The vehicle control device 30 includes a clutch drive circuit 36 as a second drive circuit that drives the clutch motor 29 (the engaging/disengaging mechanism 40) by supplying driving electric power to the clutch motor 29 based on the clutch motor control signal S_c output from the MPU 31.

The clutch drive circuit 36 is a well-known PWM control circuit using a pair of series-connected switching elements (e.g., FETs) as a base unit. The clutch motor control signal S_c that is output from the MPU 31 specifies the on/off state of each switching element. Each switching element is turned on or off in response to the clutch motor control signal S_c, whereby driving electric power is output to the clutch motor 29.

The clutch drive circuit 36 is connected at an intermediate position on the power supply line L, namely between the drive circuit 32 and the smoothing capacitor 33. The clutch drive circuit 36 turns on or off each switching element to convert DC power of the secondary battery 6 as a DC power supply to AC power, thereby supplying the AC power to the clutch motor 29 as driving electric power. When the power supply line L is electrically connected, electric power is supplied from the secondary battery 6 to the clutch drive circuit 36. When the power supply line L is electrically disconnected, no electric power is supplied from the secondary battery 6 to the clutch drive circuit 36.

How the MPU 31 controls the operation of the drive motor 11, the clutch motor 29, and the switch 34 will be described.

In the case of a normal traveling state where the vehicle 1 travels normally, the MPU 31 keeps the switch 34 in an on state so that electric power is supplied from the secondary battery 6. The MPU 31 calculates a drive motor control signal S_m according to a change in the accelerator operation amount ACC and the brake operation amount BRK of the vehicle 1, and outputs the drive motor control signal S_m to the drive circuit 32 to control operation of the drive motor 11. The MPU 31 calculates a clutch motor control signal S_c according to the status of the conditions for switching the clutch CL, and outputs the clutch motor control signal S_c to the clutch drive circuit 36 to control operation of the clutch motor 29.

When switching the clutch CL to the engaged state in the normal traveling state, the MPU 31 outputs a clutch engage command. Specifically, the MPU 31 outputs a clutch motor control signal S_c to the clutch drive circuit 36 so as to rotate the clutch motor 29 in the forward direction. When switching the clutch CL to the disengaged state in the normal traveling state, the MPU 31 outputs a clutch disengage command. Specifically, the MPU 31 outputs a clutch motor control signal S_c to the clutch drive circuit 36 so as to rotate the clutch motor 29 in the reverse direction.

Abnormality processing will be described which is performed by the MPU 31 when an abnormality is detected in the normal traveling state of the vehicle 1.

If the vehicle 1 has a collision accident etc. while traveling normally, the acceleration sensor 9A detects impact on the vehicle 1. In a collision accident, it is necessary to discharge the smoothing capacitor 33 to protect an occupant from electric shock. The MPU 31 determines if there is any abnormality in the vehicle 1 or not based on the detection result of the acceleration sensor 9A, and performs processing according to the determination result.

Figure 4:
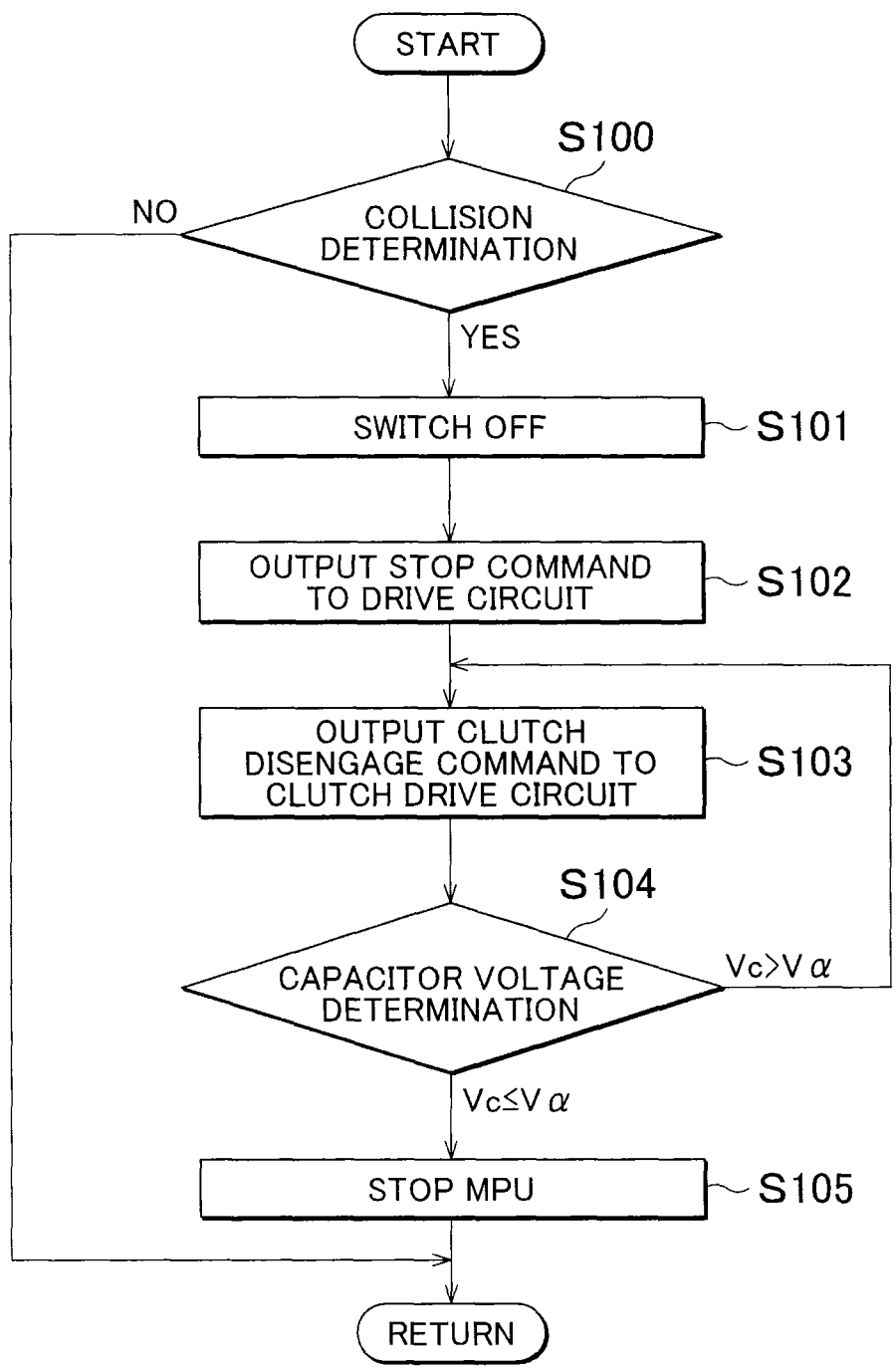
FIG. 4 is a flowchart illustrating abnormality processing according to a first embodiment.

FIG. 4 is a flowchart of the abnormality processing. In the abnormality processing, the MPU 31 makes a collision determination to determine if a collision of the vehicle 1 has occurred or not (step S100). The MPU 31 makes this collision determination based on whether or not the variation GS in impact received from the acceleration sensor 9A is equal to or larger than a predetermined threshold GSα. This threshold GSα is set based on a variation that is expected when the vehicle 1 has a collision accident. This expected value is obtained in advance by experiments, computer simulation, etc. The MPU 31 determines that a collision of the vehicle 1 has occurred if the variation GS in impact received from the acceleration sensor 9A is equal to or larger than the predetermined threshold GSα.

If it is determined in step S100 that no collision of the vehicle 1 has occurred (S100: NO), the MPU 31 terminates the abnormality processing. On the other hand, if it is determined in step S100 that a collision of the vehicle 1 has occurred (S100: YES), the MPU 31 turns off the switch 34 in order to disconnect the drive circuit 32 and the clutch drive circuit 36 from the secondary battery 6 (step S101: switch OFF).

The MPU 31 then outputs a stop command to the drive circuit 32 so as to stop the drive motor 11 (step S102). The MPU 31 outputs a clutch disengage command to the clutch drive circuit 36 so as to disengage the clutch CL (step S103). In step S103, the MPU 31 outputs a clutch motor control signal S_c so as to rotate the clutch motor 29 in the reverse direction at a predetermined rotational speed.

After outputting the stop command and the clutch disengage command, the MPU 31 determines whether or not an output voltage Vc of the smoothing capacitor 33 has decreased to a predetermined threshold Vα or less (step S104: capacitor voltage determination). The MPU 31 makes this capacitor voltage determination based on whether or not the output voltage Vc received from the voltage sensor 35 is equal to or lower than the predetermined threshold Vα. This predetermined threshold Vα is set to such a voltage that its influence on an occupant is negligible even if the smoothing capacitor 33 has charge stored therein.

If it is determined in step S104 that the output voltage Vc of the smoothing capacitor 33 is higher than the threshold Vα (S104: Vc>Vα), the routine returns to step S103, where the MPU 31 repeatedly outputs a clutch disengage command. On the other hand, if it is determined in step S104 that the output voltage Vc of the smoothing capacitor 33 has decreased to the threshold Vα or less (S104: Vc≤Vα), the MPU 31 stops its operation (S105). That is, the MPU 31 terminates the abnormality processing, the processing associated with the rotation operation of the drive motor 11 and the clutch motor 29.

Functions of the vehicle control device 30 will be described below.

FIG. 5A is a diagram schematically showing how electric power is supplied to the drive circuits when the vehicle is in the normal traveling state. The drive circuit 32 and the clutch drive circuit 36 are connected to the secondary battery 6, and DC power that is output from the secondary battery 6 is smoothed by the smoothing capacitor 33 and input to the drive circuit 32 and the clutch drive circuit 36. Charge is accumulated in the smoothing capacitor 33 in the process of smoothing the DC power that is output from the secondary battery 6.

FIG. 5B is a diagram schematically showing how electric power is supplied to the drive circuits after it is determined that a collision accident of the vehicle 1 has occurred. The drive circuit 32 and the clutch drive circuit 36 are disconnected from the secondary battery 6. The vehicle control device 30 changes control of the drive circuit 32 from normal control to control of stopping rotation of the drive motor 11. Electric power generated by the charge stored in the smoothing capacitor 33 is thereafter temporarily supplied to the engaging/disengaging mechanism 40 via the clutch drive circuit 36. In addition, since the clutch motor 29 is rotated through step S103 of the abnormality processing, the charge in the smoothing capacitor 33 is consumed and the smoothing capacitor 33 is discharged.

If it is determined that a collision of the vehicle 1 has occurred, the vehicle control device 30 changes control of the clutch drive circuit 36 from normal control to control of disengaging the clutch CL. Since torque transmission between the drive motor 11 and each rear wheel 15 is cut off, torque transmission from each rear wheel 15 to the drive motor 11 is also cut off. For example, torque transmission from each rear wheel 15 to the drive motor 11 is thus cut off even when the vehicle 1 is towed by a tow truck after a collision accident. Since the drive motor 11 does not rotate, no regenerative electric power is generated, and accumulation of charge in the smoothing capacitor 33 can be prevented.

When it is determined that a collision of the vehicle 1 has occurred, the smoothing capacitor 33 may still have charge stored therein even if torque transmission between the drive motor 11 and each rear wheel 15 is cut off. Since the control of disengaging the clutch CL can be continued for the clutch drive circuit 36 even after the torque transmission is cut off, charge stored in the smoothing capacitor 33 can be consumed and the smoothing capacitor 33 can be discharged.

As described above, the present embodiment has the following advantageous effects.

(1) When an abnormal condition of the vehicle 1 is detected, the drive circuits 32, 36 are disconnected from the secondary battery 6, and the clutch motor 29 is rotated, whereby the smoothing capacitor 33 can be discharged. This eliminates the need for a dedicated device etc. to discharge the smoothing capacitor 33, and can suppress an increase in size of the vehicle control device 30.

(2) Accumulation of charge in the smoothing capacitor 33 can be suppressed after the vehicle 1 has a collision accident. This can prevent electric shock of an occupant and ensure safety.

(3) The smoothing capacitor 33 can be discharged when the vehicle 1 has a collision accident. This can prevent electric shock of the occupant and ensure safety.

(4) When it is determined that a collision of the vehicle 1 has occurred, the clutch drive circuit control is repeated so that the output voltage Vc representing the remaining charge in the smoothing capacitor 33 decreases to the predetermined threshold Vα or less. This allows the smoothing capacitor 33 to be reliably discharged.

A flow of abnormality processing of a second embodiment of the vehicle control device will be described with reference to FIG. 6. The second embodiment is different from the first embodiment only in the conditions for determining an abnormal condition and the contents of the control of the clutch drive circuit 36 in the abnormality processing. Accordingly, the same configuration and the same contents of the control as in the above embodiment will be denoted with the same reference numerals etc., and description thereof will be omitted.

When driving a vehicle, an occupant may brake suddenly in order to avoid a collision accident. Whether the occupant has braked suddenly or not can be determined based on the outputs of the brake sensor 7A and the vehicle speed sensor 10A. Even if the occupant brakes suddenly, the vehicle 1 may not stop in time to avoid a collision accident. Moreover, the acceleration sensor 9A may be broken upon collision, and may not be able to detect the collision. In the second embodiment, the MPU 31 makes a sudden braking determination (step S200) instead of the collision determination (step S100) in the first embodiment. The MPU 31 performs abnormality processing according to the detection results of the brake sensor 7A and the vehicle speed sensor 10A while the vehicle 1 is in a normal traveling state. In the following description, it is assumed that the clutch CL is in an engaged state upon sudden braking.

Figure 6:
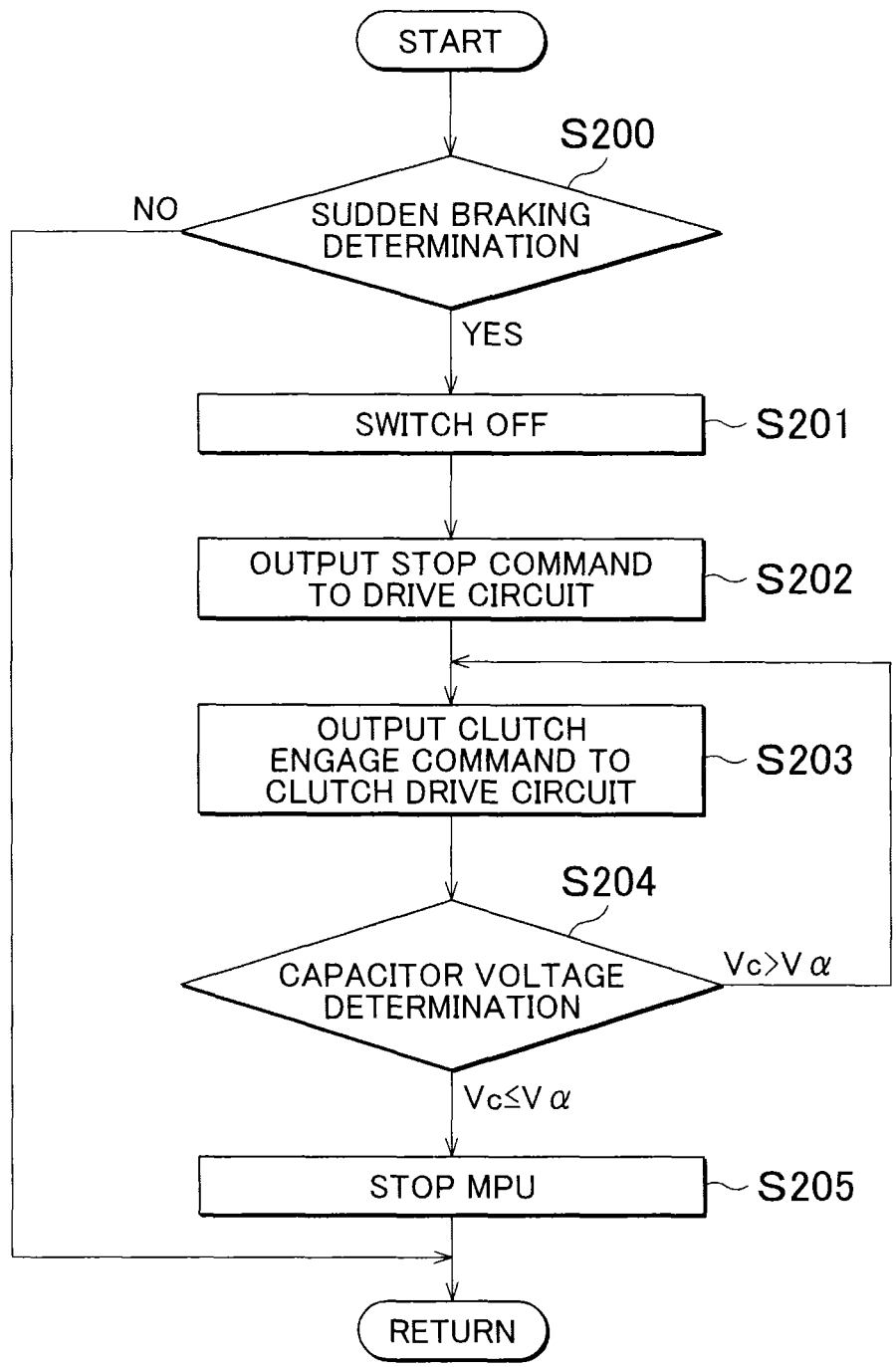
FIG. 6 is a flowchart illustrating abnormality processing according to a second embodiment.

As shown in FIG. 6, in the abnormality processing, the MPU 31 makes a sudden braking determination to determine if the occupant of the vehicle 1 has braked suddenly (step S200). The MPU 31 makes this sudden braking determination based on whether or not the brake operation amount BRK of the brake pedal 7 received from the brake sensor 7A is equal to or larger than a predetermined threshold BRKα, and whether or not the amount of decrease in vehicle speed SP received from the vehicle speed sensor 10A is equal to or larger than a predetermined threshold SPα. The threshold BRKα and the threshold SPα are set based on experiments or computer simulation that is performed in advance.

The MPU 31 determines that the vehicle 1 has been braked suddenly if the brake operation amount BRK received from the brake sensor 7A is equal to or larger than the threshold BRKα and the amount of decrease in vehicle speed SP received from the vehicle speed sensor 10A is equal to or larger than the threshold SPα. On the other hand, the MPU 31 determines that the vehicle 1 has not been braked suddenly if the brake operation amount BRK received from the brake sensor 7A is lower than the threshold BRKα and the amount of decrease in vehicle speed SP received from the vehicle speed sensor 10A is lower than the threshold SPα.

If it is determined in step S200 that the vehicle 1 has not been braked suddenly (S200: NO), the MPU 31 terminates the abnormality processing. On the other hand, if it is determined in step S200 that the vehicle 1 has been braked suddenly (S200: YES), the MPU 31 turns off the switch 34 in order to disconnect the drive circuit 32 and the clutch drive circuit 36 from the secondary battery 6 (step S201).

The MPU 31 then outputs a stop command to the drive circuit 32 so as to stop the drive motor 11 (step S202). The MPU 31 outputs a clutch engage command to the clutch drive circuit 36 so as to engage the clutch CL, namely so as to maintain the engaged state of the clutch CL (step S203). In step S203, the MPU 31 outputs a clutch motor control signal S_c so as to rotate the clutch motor 29 in the forward direction at a predetermined rotational speed.

After outputting the stop command and the clutch engage command, the MPU 31 determines whether or not the output voltage Vc of the smoothing capacitor 33 has decreased to the predetermined threshold $V\alpha$ or less (step S204: capacitor voltage determination).

If it is determined in step S204 that the output voltage Vc of the smoothing capacitor 33 is higher than the threshold $V\alpha$ (S204: Vc>$V\alpha$), the routine returns to step S203, where the MPU 31 repeatedly outputs a clutch engage command. On the other hand, if it is determined in step S204 that the output voltage Vc of the smoothing capacitor 33 has decreased to the threshold $V\alpha$ or less (S204: Vc≤$V\alpha$), the MPU 31 stops its operation (S205).

Functions of the vehicle control device 30 will be described below.

If it is determined that the vehicle 1 has been braked suddenly, the clutch motor 29 is rotated so as to maintain the engaged state of the clutch CL. That is, the smoothing capacitor 33 can be discharged in advance in preparation for the subsequent collision of the vehicle 1. Accordingly, if it is determined that the vehicle 1 has been braked suddenly, and a collision of the vehicle 1 occurs subsequently, the smoothing capacitor 33 has already started being discharged at the time the collision occurs. The smoothing capacitor 33 has thus been discharged to some extent at the time the collision occurs.

As described above, the present embodiment has the following advantageous effect in addition to the advantageous effect (1) of the first embodiment.

(5) Even if a collision of the vehicle 1 occurs after sudden braking, the smoothing capacitor 33 has already started being discharged at the time the collision occurs. The smoothing capacitor 33 has thus been discharged to some extent at the time the collision occurs. This can ensure increased safety of an occupant at the time the collision occurs.

Each of the above embodiments can be modified as appropriate as follows.

Rotation of the clutch motor 29 in the abnormality processing may be continued until the rotation stops by detecting the rotational speed of the clutch motor 29.

In step S105 (step S205) of the abnormality processing, the operation of the MPU 31 may be stopped when it is determined that the vehicle 1 has stopped.

In the first embodiment, rotation of the clutch motor 29 in the abnormality processing may be stopped when the clutch CL is disengaged.

In the first embodiment, the clutch motor 29 may be rotated in the reverse direction, namely so as to maintain the engaged state of the clutch CL, in the abnormality processing.

In the first embodiment, a pressure sensor may be used instead of the acceleration sensor 9A in the abnormality processing (step S100). The pressure sensor can be incorporated into the vehicle control device 30. In this processing, whether a collision of the vehicle 1 has occurred or not may be determined based on the amount of decrease in vehicle speed SP. Alternatively, whether a collision of the vehicle 1 has occurred or not may be determined based on the output of a rotation angle sensor etc. provided in the drive motor 11.

In the second embodiment, the clutch motor 29 may be rotated in the positive direction, namely so as to disengage the clutch CL, in the abnormality processing.

In the second embodiment, whether a collision of the vehicle 1 has occurred or not may be determined after it is determined that the vehicle 1 has been braked suddenly. In this case, for example, steps S204, S205 may be performed if it is determined that a collision of the vehicle 1 has occurred, and the abnormality processing may be terminated if it is determined that no collision of the vehicle 1 has occurred. This allows the occupant to immediately handle the subsequent situation that requires acceleration of the vehicle 1 in the case where no collision of the vehicle 1 occurs after sudden braking of the vehicle 1.

In the sudden braking determination of the second embodiment, whether the occupant of the vehicle 1 has braked suddenly or not may be determined based only on the brake operation amount BRK or based only on the amount of decrease in vehicle speed SP. Alternatively, whether the occupant of the vehicle 1 has braked suddenly or not may be determined based on the output of a rotation angle sensor etc. provided in the drive motor 11.

In the second embodiment, a predictive collision determination may be made instead of the sudden braking determination. Namely, whether a collision will occur or not may be predicted with an on-board camera or a millimeter wave radar.

The specific configuration of the clutch CL may be modified. For example, the clutch CL may be formed by a single clutch plate, or an electromagnetic clutch may be used as the clutch CL. In the case of using an electromagnetic clutch, the engaging/disengaging mechanism 40 is formed by the clutch CL and an actuator etc. as a driving source for the clutch pressing portion 26.

Although a mechanical relay is used as the switch 34, the invention should not be limited to this. For example, a switching element such as an FET may be used as the switch 34.

A separate control device may be provided to switch the switch 34. The control device switches the switch 34 in response to the detection results of the brake sensor 7A, the acceleration sensor 9A, and the vehicle speed sensor 10A or in response to a command from the MPU 31.

Although the vehicle control device 30 controls operation of the drive motor 11 coupled to the rear wheels 15, the invention should not be limited to this, and the vehicle control device 30 may control operation of a motor that is used for other purposes. An example of such a motor includes an in-wheel motor.

A separate control device may be provided to control the clutch drive circuit 36. The control device controls the clutch motor 29 in response to the detection results of the brake sensor 7A, the acceleration sensor 9A, the vehicle speed sensor 10A, etc.

The vehicle control device 30 need only control at least the engaging/disengaging mechanism 40. As an on-vehicle device, the vehicle control device 30 may additionally perform control associated with air-conditioning such as an air conditioner.

The vehicle control device 30 may use a converter circuit as each drive circuit, or may be used as a vehicle control device that causes a rotating electrical machine to function as a generator.

The vehicle 1 may be a hybrid vehicle with a different drive system, or may be a so-called electric vehicle. Alternatively, the vehicle 1 may be a fuel cell vehicle using a fuel cell as a power supply.

A different type of motor may be used as the drive motor 11 or the clutch motor 29. For example, a brushless DC motor or an AC motor may be used as the clutch motor 29. In the case of using a different type of motor, the corresponding drive circuit is also changed according to the motor.

What is claimed is:

1. A vehicle control device in a vehicle having at least one driven body, a rotating electrical machine, and an engaging/disengaging mechanism having a function to permit and cut off torque transmission between the rotating electrical machine and the at least one driven body, the vehicle control device comprising:
    a smoothing capacitor;
    a first drive circuit;
    a second drive circuit;
    a control circuit; and
    a switch, wherein
    the smoothing capacitor smooths electric power that is applied from a power supply mounted on the vehicle, wherein
    the first drive circuit drives the rotating electrical machine with the electric power smoothed by the smoothing capacitor, wherein
    the second drive circuit drives the engaging/disengaging mechanism with the electric power smoothed by the smoothing capacitor, wherein
    the control circuit controls the first drive circuit and the second drive circuit, wherein
    the switch has a function to connect and disconnect the first drive circuit and the second drive circuit to and from the power supply, and is provided closer to the power supply such that the smoothing capacitor is interposed between the switch and the first and second drive circuits, wherein
    if an abnormal condition of the vehicle is detected in a state where the drive circuits are connected to the power supply, the control circuit
        controls driving of the engaging/disengaging mechanism so as to cut off the torque transmission, and
        switches the switch to disconnect the drive circuits from the power supply and supplies electric power generated by a charge stored in the smoothing capacitor to the engaging/disengaging mechanism via the second drive circuit.

2. The vehicle control device according to claim 1, wherein
    the abnormal condition is detected by using a change in impact on the vehicle as an index.

3. The vehicle control device according to claim 2, wherein
    the control circuit is configured to be able to continue to drive the engaging/disengaging mechanism even after the torque transmission is cut off, in the case where the control circuit controls driving of the engaging/disengaging mechanism so as to cut off the torque transmission in response to the detection of the abnormal condition.

4. The vehicle control device according to claim 1, wherein
    the abnormal condition is detected by using a change in braking of the vehicle as an index, and
    the control circuit controls driving of the engaging/disengaging mechanism so as to maintain the torque transmission, in the case where the control circuit supplies the electric power generated by the charge stored in the smoothing capacitor to the engaging/disengaging mechanism in response to the detection of the abnormal condition.

5. The vehicle control device according to claim 2, wherein
    operation of the control circuit is stopped if the remaining charge in the smoothing capacitor is equal to or less than a predetermined value, in the case where the control circuit controls driving of the engaging/disengaging mechanism so as to cut off the torque transmission in response to the detection of the abnormal condition.

* * * * *